US006666171B2

(12) United States Patent
Frink (10) Patent No.: US 6,666,171 B2
(45) Date of Patent: Dec. 23, 2003

(54) HOLDING HARNESS WITH URINE COLLECTING DEVICE

(75) Inventor: Martin Frink, Wedemark (DE)

(73) Assignee: Solvay Pharmaceuticals GmbH, Hannover (DE)

( * ) Notice: Subject to any disclaimer, the term of this patent is extended or adjusted under 35 U.S.C. 154(b) by 0 days.

(21) Appl. No.: 09/999,490

(22) Filed: Dec. 3, 2001

(65) Prior Publication Data

US 2002/0134319 A1 Sep. 26, 2002

Related U.S. Application Data

(63) Continuation of application No. PCT/EP00/04872, filed on May 29, 2000.

(30) Foreign Application Priority Data

Jan. 6, 1999 (EP) .............................. 99109366

(51) Int. Cl.[7] .............................................. A01K 23/00
(52) U.S. Cl. ..................................... 119/869; 604/327
(58) Field of Search .............................. 119/869, 867, 119/868, 850; 54/79.1, 79.2, 79.4

(56) References Cited

U.S. PATENT DOCUMENTS

| 224,468 A | * | 2/1880 | Palmer .................. 54/79.2 |
| 337,181 A | * | 3/1886 | McDonough ............. 119/868 |
| 502,508 A | * | 8/1893 | Cleveland et al. ............ 54/5 |
| 726,857 A | * | 5/1903 | Bulles .................. 54/79.2 |
| 831,452 A | * | 9/1906 | Mathias ................ 54/79.2 |
| 900,783 A | * | 10/1908 | Roberts ................. 119/868 |
| 2,472,186 A | * | 6/1949 | Arnold ................. 119/869 |
| 3,036,553 A | | 5/1962 | Gandier |
| 3,270,714 A | * | 9/1966 | Gandier ................ 119/867 |
| 3,850,159 A | * | 11/1974 | Langley ................ 119/869 |
| 4,893,587 A | | 1/1990 | Bailey, Jr. |
| 5,738,047 A | * | 4/1998 | McNamara .............. 119/869 |

FOREIGN PATENT DOCUMENTS

| FR | 925362 | 4/1946 | | |
| FR | 2193545 | 7/1973 | | |
| WO | WO 97/21343 | * | 6/1997 | ......... A01K/23/00 |
| WO | WO 99/57969 | * | 11/1999 | ......... A01K/23/00 |
| WO | WO 0/60928 | * | 10/2000 | ......... A01K/23/00 |

* cited by examiner

Primary Examiner—Peter M. Poon
Assistant Examiner—Son T. Nguyen
(74) Attorney, Agent, or Firm—Crowell & Moring LLP (57) ABSTRACT

A holding harness with a urine collecting device for horses, as well as a urine collecting device suitable for the holding harness and a special head part for such a urine collecting device, which is advantageously suitable for collecting urine from pregnant mares for obtaining natural mixtures of conjugated estrogens. The holding harness according to the invention with urine collecting device offers high flexibility and comfort of wear for the horse. The freedom of movement of the horse is not significantly impaired by the holding harness with urine collecting device, so that grazing is possible and it is unnecessary to tether the horse in a narrow stall.

6 Claims, 9 Drawing Sheets

HOLDING HARNESS WITH URINE COLLECTING DEVICE

CROSS REFERENCE TO RELATED APPLICATIONS

This application is a continuation of international patent application no. PCT/EP00/04872, filed May 29, 2000, designating the United States of America, the entire disclosure of which is incorporated herein by reference. Priority is claimed based on European patent application no. EP 99109366.7, filed Jun. 1, 1999.

BACKGROUND OF THE INVENTION

The present invention relates to a holding harness with a urine collecting device for horses. The holding harness with urine collecting device according to the invention is intended in particular for obtaining a natural mixture of conjugated estrogens from the urine of pregnant mares.

Estrogens are used in medicine for hormone replacement therapy. In particular, estrogen mixtures are used for the treatment and prophylaxis of the disorders of the climacteric period which occur in women after natural or artificial menopause. In this case, natural mixtures of conjugated estrogens such as are found in the urine of pregnant mares have proved particularly effective and readily compatible.

The collection of the urine is therefore a significant partial step in obtaining hormone, and requires suitable devices which permit the urine to be collected in a practicable manner which is compatible with the animal. In particular, the device should be easy to wear and be compatible with the normal behaviour and requirements of mobility and rest of the horse. Furthermore, the device should however also permit flexible (easy attachment and removal or exchange) collection of the urine which is effected as purely as possible (no faeces) and in a manner protecting the hormone.

The harness should be readily adaptable to the individual dimensions of the horse and fix the urine collecting device sufficiently in the desired position on the horse. Once the urine collecting device has been attached, if at all possible no readjustment, or only infrequent readjustment, should be necessary, and—while also allowing the horse as great a freedom of movement as possible—urine collecting which is as loss-free as possible should be ensured.

SUMMARY OF THE INVENTION

It was therefore an object of the invention to provide a novel holding harness with a urine collecting device for horses.

It was also an object of the invention to provide a holding harness which can be fastened flexibly and is exchangeable.

Yet another object of the invention was to provide a holding harness which meets the high demands made in relation to practical use on a large scale.

A further object of the invention is to provide a holding harness and urine collecting device which can be comfortably worn by a horse, especially a pregnant mare.

In accordance with a first aspect of the invention, the objects are achieved by providing a holding harness as described and claimed hereinafter.

In a second aspect of the invention, the objects are achieved by providing a urine collecting device as described and claimed hereinafter.

In a third aspect of the invention, the objects are attained by providing a combination holding harness and urine collecting device as described and claimed hereinafter.

The objects are met in accordance with yet another aspect of the invention by providing a specially configured head part for a mare urine collecting device.

The invention therefore envisions a holding harness with a urine collecting device for horses, in particular mares, which is distinguished by the elements arranged as follows:
A) a basic harness consisting of straps, comprising:
   a girth (1) passing around the horse and extending on both sides from the back to the lower breast, to which girth in each case at least two conventional fastening elements (1a) of adjustable length are attached in the lateral upper part at some distance from each other;
   a breast strap (2) extending around the front breast (shoulder) approximately horizontally on both sides of the horse in each case as far as the girth;
   a lower breast strap (3) extending from the shoulder, through between the front legs to the girth;
   a withers strap (4) extending from the withers on both sides of the horse to the breast strap;
   a crupper (5) of adjustable length, extending from the withers strap along the spinal column over the back, loins and croup of the horse to the tail head, with a tail loop (5a) surrounding the tail head;
   on either side of the horse one side strap (6) extending from the withers strap approximately at the height of the start of the shoulder approximately horizontally to the girth;
   the individual straps of the basic harness being equipped with conventional elements for adjusting the strap lengths and being joined together in a manner conventional for horse harnesses, if necessary in completely or partially detachable manner; and
B) a large-mesh net (7) covering approximately the loin and croup region and descending laterally to at most approximately the lower rump line, which net is held by the fastening elements (1a) of adjustable length located on the upper part of the girth, and on which furthermore
C) a urine collecting device is suspended detachably but in a position-fixing manner, this urine collecting device in turn comprising:
   an elongate collecting pouch (8) which can be suspended in an approximately horizontal position beneath the belly of the horse;
   a middle section (9) which tapers in a funnel shape, adjoining the collecting pouch in the region of the rear legs of the horse, which section is passed through between the rear legs and merges into a tubular connecting piece (9a) with an approximately vertical arrangement towards the rear part of the horse;
   a head part (10), seated on the connecting piece (9a) and connected securely thereto by means of a tubular neck (10a), with a urine collecting shell (10b) adapted to the vulva of the horse and lying largely tightly thereagainst; and
   for fastening the urine collecting device to a holding harness, at least several flaps (11a) and (11b) provided with one or more eyelets, with
      a) the flaps (11a) being arranged on both sides in the lateral, upper region of the collecting pouch (8), and
      b) the flaps (11b) being arranged to the rear side of the urine collecting shell (10b) on both sides in the upper region of the head part (10).

For embodying the invention, in one aspect in particular, a holding harness is provided which is suitable for fastening a urine collecting device to horses and has the following features:

A) a basic harness consisting of straps, comprising:
- a girth (1) passing around the horse and extending on both sides from the back to the lower breast, to which girth in each case at least two conventional fastening elements (1a) of adjustable length are attached in the lateral upper part at some distance from each other;
- a breast strap (2) extending around the front breast (shoulder) approximately horizontally on both sides of the horse in each case as far as the girth;
- a lower breast strap (3) extending from the shoulder, through between the front legs to the girth;
- a withers strap (4) extending from the withers on both sides of the horse to the breast strap;
- a crupper (5) of adjustable length, extending from the withers strap along the spinal column over the back, loins and croup of the horse to the tail head, with a tail loop (5a) surrounding the tail head;
- on either side of the horse one side strap (6) extending from the withers strap approximately at the height of the start of the shoulder approximately horizontally to the girth;
- the individual straps of the basic harness being equipped with conventional elements for adjusting the strap lengths and being joined together in a manner conventional for horse harnesses, if necessary in completely or partially detachable manner; and B) a large-mesh net (7) covering approximately the loin and croup region and descending laterally to at most approximately the lower rump line, which net is held by the fastening elements of adjustable length located on the upper part of the girth, and which serves for the position-fixing, but yet detachable suspension of a urine collecting device which can be worn beneath the horse's belly.

In one variant of the holding harness, the withers strap (4) may optionally divide in a Y-shape into two partial belts towards the breast strap on either side of the horse starting approximately at the level of the start of the shoulder. By means of this, if desired the stability and the seat of the holding harness on the horse can be additionally positively influenced.

The horse harness A) may be a conventional horse harness which has been adapted by hand or by machine manufacture to the intended purpose at which the present invention is aimed. The individual straps of the holding harness may be made of conventional materials, such as leather or other materials, which are also usually used for the production of bridles and harnesses for horses. In this case, composite structures may also be considered, e.g. reinforcement elements applied to leather at regions of increased stress on the material. Flexible plastics strips or fabrics or alternatively firefighting hose fabric may be used as materials for such reinforcement elements. The individual straps and other elements of the horse harness A) may be joined together in a manner conventional for horse harnesses. Secure joins of the straps may be obtained by seams or rivets. The horse harness A) should however permit a certain amount of flexibility with regard to the individual adaptation to the proportions of the respective horse. If, therefore, the individual straps are not from the outset joined detachably together in the respective connection regions via connecting elements of adjustable length, such as conventional strap buckles, quick-action belts or other variable rapid-closure means, but are sewn or riveted together, i.e. are securely joined together, the straps should be equipped at a different point with corresponding, conventional elements for setting and adjusting the strap lengths, such as the aforementioned strap buckles, quick-action belts or other conventional elements for varying length. In order to permit the attachment of the harness in a simple manner by pulling over the horse's head, expediently the girth is undone in the region of the belly and connected detachably to the lower breast strap. In order to protect individual parts of the horse's body, the harness A) may furthermore have padding of different thicknesses, depending on the part of the body. Padding may be desirable in particular for the front breast region, withers and back, but possibly also additionally on the side breast wall of the horse. Conventional materials may be used for the padding; for example, felted material of different thicknesses is suitable.

One particular element B) of the holding harness according to the invention for suspending or fastening a urine collecting device to horses is the large-mesh net (7). The use of a net with the holding harness of the present invention has, for example, the advantage that it offers a plurality of possible methods of fastening any type of urine collecting device and thus these collecting devices can be fixed to and adjusted on the horse in an ideal manner with great flexibility. This net is therefore very advantageous for optimum suspension and fixing of urine collecting devices in particular for mares, since in this case, as low-loss collection of the mare's urine as possible can only be ensured if the urine collecting device is permanently and perfectly fixed and adjusted. Using the net for suspending urine collecting devices and the possibilities for fixing and adjusting these urine collecting devices which this yields means that a significant improvement in urine collecting is achieved. Furthermore, the net—in contrast, for example, to a horse blanket—largely prevents any sweating by the horse. There is then no fear of adversely affecting the obtention of estrogen by hormone loss due to secretion of sweat when using the net in the holding harness according to the invention.

The lateral ends of the net may hang down at most as far as the lower rump line; in another exemplary embodiment it is sufficient if the lateral ends of the net hang down as far as about the level of the breast strap (2). The ends of the net hanging down may if desired be additionally held by one or more loosely attached belts which pass from one side to the other beneath the horse. The large-mesh net may be made of any materials compatible with the horse, such as in particular nylon, but possibly also synthetic fibres, leather or hemp. The strength of the net fabric should be sufficiently great to withstand long-lasting stress in practice. The net edges in advantageous, preferred embodiments of the net will be made reinforced. Furthermore, it is recommended, for example, to heat-treat the net at the edges, in order to prevent the risk of fraying by slightly melting the nylon fibres.

The following particulars of the dimensions of the net are intended to explain the configuration of this aspect of the invention only by way of example. It goes without saying that the person skilled in the art can vary these dimensions thoroughly and adapt them to individual circumstances, requirements or other boundary conditions when carrying out the invention at a given location. The mesh size of the net may generally be of the order of about 30 to 60 mm. A mesh size of about 45 mm has proved particularly expedient. The cross-sectional diameter (thickness) of the net cords will be approximately in the range from 3 to 8 mm, in particular about 5 mm.

A further aspect of the invention relates to a urine collecting device for mares (mare urinal), which is distinguished by the following features:
- an elongate collecting pouch (8) which can be suspended in an approximately horizontal position beneath the belly of the horse;

a middle section (9) which tapers in a funnel shape, adjoining the collecting pouch in the region of the rear legs of the horse, which section is passed through between the rear legs and merges into a tubular connecting piece (9a) with an approximately vertical arrangement towards the rear part of the horse;

a head part (10), seated on the connecting piece (9a) and connected securely thereto by means of a tubular neck (10a), with a urine collecting shell (10b) adapted to the vulva of the horse and lying largely tightly thereagainst; and for fastening the urine collecting device to a holding harness, at least several flaps (11a) and (11b) provided with one or more eyelets, with a) the flaps (11a) being arranged on both sides in the lateral, upper region of the collecting pouch (8), and b) the flaps (11b) being arranged to the rear side of the urine collecting shell (10b) on both sides in the upper region of the head part (10).

The urine collecting device of the present invention may be made of any urine-resistant materials compatible with the horse, such as latex, silicone or the like, and be produced by a processing method conventional for these materials (e.g. in a dipping process or an injection molding process). If desired, fabrics which are coated with the above materials or alternatively with rubber or polyurethane materials etc., such as are used for coating rainwear and tarpaulins, may serve as a base. Many types of materials made of natural or synthetic fibers may be used as fabrics, e.g. cotton fabric, nylon fabric or the like. The individual parts of the urinal may in this case be glued or welded together. If desired, the entire urinal, once the individually manufactured parts have been assembled, may be coated in its entirety (using conventional process techniques, e.g. in a dipping process or an injection molding process) with an additional protective latex or silicone layer of desired thickness. Hitherto, in particular latex (commercially available types) or rubberized fabric, but for individual parts also silicone, have proved advantageous as materials. Latex or silicone is preferably used here e.g. for manufacturing the head part (10) and latex or rubberized fabric in particular for manufacturing the collecting part, i.e. collecting pouch (8) and optionally middle section (9). The urine collecting device should be sufficiently robust for the intended purpose, but yet somewhat flexible, in order thus equally to ensure both long wearing and comfort of wear. Due to the overall flexible configuration of the mare urinal, it may be advantageous to provide those regions which are subject to particular stress during use or require better dimensional stabilization with reinforcement. For example, it has proved advantageous, in the middle section (9), to reinforce the region (9b) of the connecting piece (9a) on which the neck (10a) of the head (10) is seated in overlapping manner on the inside with a short tubular insert.

Figure 5A:
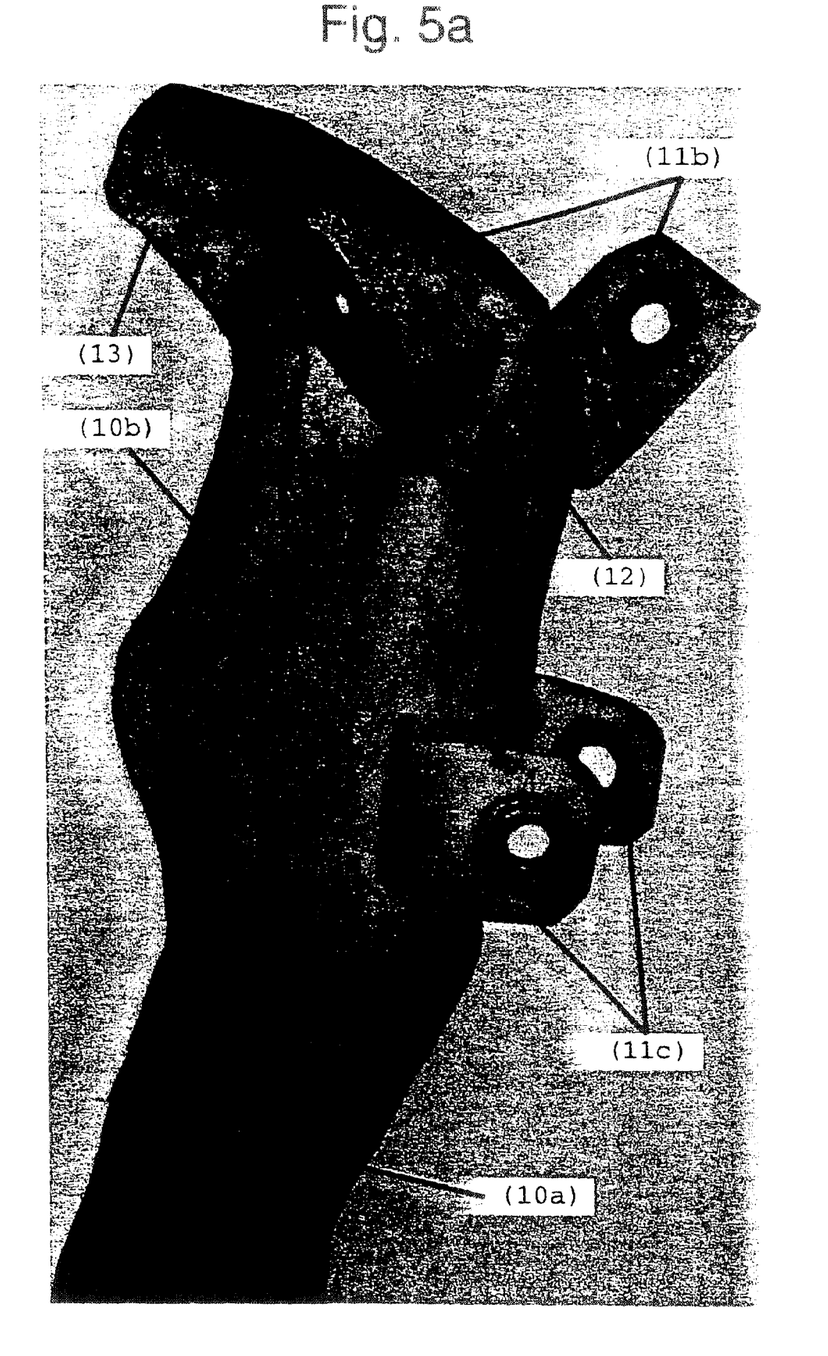
FIG. 5a Rear/side view of the head part (10) of the urine collecting device with individual flaps.
Figure 5B:
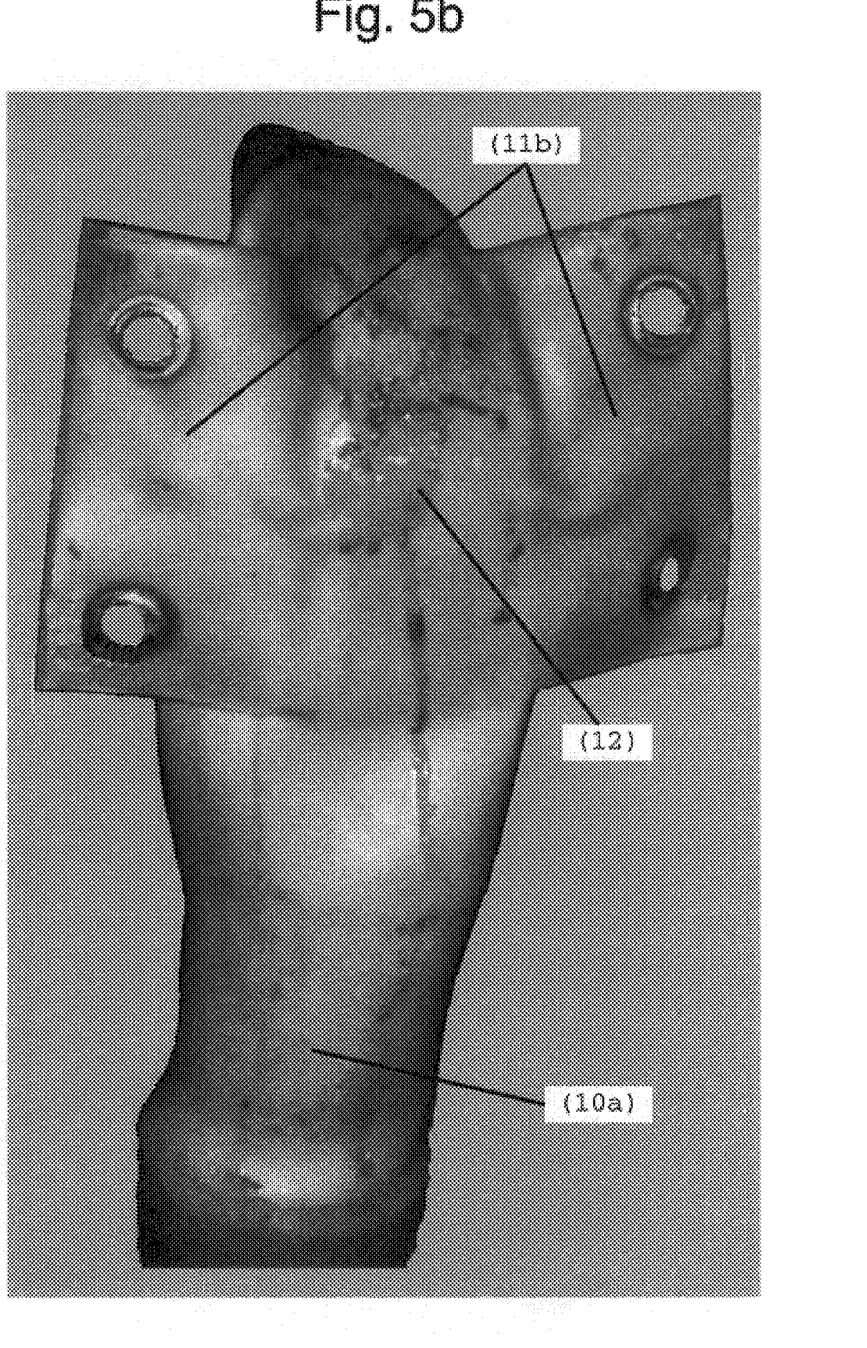
FIG. 5b Rear view of a preferred head part (10) of the urine collecting device with two-eyelet wing flaps on both sides.

The suspension flaps with eyelets for fastening the urine collecting device to the net (7) may be of any design, provided that they fulfill their purpose. Thus, for example, the flaps attached laterally in the region of the collecting pouch may be individual flaps each with only one eyelet or alternatively combined wing flaps having a plurality of eyelets. Advantageous examples include individual or wing flaps (11a) having 1 to 5, in particular wing flaps having 2 to 3, eyelets. The flaps (11b) on the head (10) of the urinal may likewise be in the form of small wing flaps with 2 to 3 eyelets instead of individual flaps with only 1 eyelet, as shown e.g. in FIG. 5b. If desired, the mare urinal may have additional flaps (11c) in the middle rear region of the head part (10), as shown in FIG. 5a; these flaps (11c) are however purely optional and may also be omitted, as shown in FIG. 5b. The urine collecting device may be fastened via the flaps to the net of the holding harness in many different ways, e.g. by means of cords, expanders, belts or the like. In particular fastening by expanders has proved advantageous for practical use. Commercially available expanders with hooks may be used; however, expanders or rubber cables with carbiner hooks which lie flat, made, e.g., of plastics material, are more advantageous due to the lesser risk of injury to the horse.

An example of a configuration of the mare urinal will be explained further below using the following dimensions, the values given being understood to represent an order of magnitude which can fully be varied by the person skilled in the art and adapted to individual circumstances and requirements, e.g. the type of horse, in each case. The length of the collecting pouch (8), including the horizontal portion of the middle section (9), will be in the range from 40 to 55 cm, with a cross-sectional diameter of about 12 to 20 cm, in particular about 15 cm. The height of the middle section (9), from the lower edge of the collecting pouch to the upper edge of the connecting piece (9a), is advantageously about 30 to 35 cm, with a cross-sectional diameter in the region of the connecting piece (9a) of about 6 to 8 cm. The tubular reinforcement element in the region (9b) may have a height of about 7 to 10 cm and a cross-sectional diameter of about 6 to 8 cm. The head part (10) adjoining the middle section (9) will advantageously have a height (measured vertically from the connecting piece to the upper edge) of about 30 to 35 cm, plus the region of overlap with the connecting piece (9a). Further details and dimensions of the head part will be described separately further below. The dimensions of the wing flaps (11a) are in horizontal length for 3 eyelets about 15 to 20 cm and for 4 eyelets about 20 to 30 cm, and in height a total of about 13 to 15 cm in each case, with a free eyelet area—i.e. one not connected to the collecting pouch (8) by gluing or fusion welding—which protrudes from the collecting pouch (8), of about 6 cm in height. Individual flaps on the head part (10) as a rule have a free, protruding eyelet area of about 6×6 cm±1 cm. Small wing flaps having, for example, 2 eyelets will have a width of about 8 to 10 cm and a height likewise of about 6 cm±1 cm. Particularly advantageous are medium-large wing flaps (11b) on the head part (10), as shown in FIG. 5b. If the head part (10) is viewed from behind, it can be seen that the wing flaps (11b) of this variant of the invention form, so to speak, a rectangle applied to the head part (10), with horizontal dimensions of about 20 to 22 cm and vertical dimensions of about 12 to 14 cm, the eyelets being formed in the four corners of this rectangle. This configuration of the flaps (11b) contributes advantageously to the stability of the head part, in particular in use in relation to robustness but also in relation to fixing in position. The head part is thus provided with more stability from behind and the flaps cannot tear out so quickly. The wall thickness of the urine collecting device is in the millimeter range when e.g. latex or rubberized fabrics are used, but may be up to about 10 to 15 mm in the case of silicone. The wall thickness may be adapted according to the degree of desired flexibility or rigidity in an individual case, with the flaps needing to be made somewhat stronger than the other parts of the urinal due to the increased stress.

In a further aspect of its configuration, the present invention proposes a head part (10) for a urine collecting device (mare urinal) which has the following features:

a urine collecting shell (10b) located in the upper region, which extends in an S-shape on the inside when viewed from the side, which is adapted to the vulva of the horse and lies largely tightly thereagainst, and wherein the urine collecting shell when viewed from the inner side is in the form of an oval to egg-shaped crown (10*d*) surrounding the urine entry opening (10*c*); and a tubular neck (10*a*) located in the lower region of the head part, which neck serves to connect the head part to the inlet connecting piece (9*a*) of a urine collecting pouch.

For optimum collection of the urine which is as loss-free as possible, the shape of the head part (10) of the urine collecting device is designed according to the invention in a special manner in that it has a urine collecting shell (10*b*) which is adapted geometrically to the anatomy of the horse's vulva and lies substantially tightly thereagainst. The urine collecting shell closes off the upper part of the head part (10) and extends approximately in an S-shape on the inside directed towards the vulva when viewed from the side. The urine collecting shell when viewed from the inner side is in the form of an oval or egg-shaped to droplet-shaped crown (10*d*) surrounding the urine entry opening. The urine collecting shell is preferably made from the same flexible materials as the other parts of the urine collecting device, e.g. latex, silicone or the like. The head part is likewise made to be completely flexible, but it may be advantageous, for better dimensional stabilization during use or to improve the long-wearing properties, to reinforce the rearward upper region of the head part—i.e. in the region in which the flaps (11*b*) start or optionally including the region of a few centimeters thereabove and/or thereunder—or optionally to provide it with flexible reinforcing elements. These reinforcement elements or stiffening elements may be connected to the flaps (11*b*) and adapted to the material thickness thereof. Such a reinforcement element (12) is shown, for example, for individual flaps in FIG. 5*a* with a width corresponding to the rear head part width of about 6 to 7 cm and a height of about 8 cm. A preferred configuration of a head part (10) with a reinforcing element combined with two-eyelet wing flaps (11*b*) on either side can be seen e.g. in FIG. 5*b* and has already been described above with exemplary dimensions.

The geometric dimensions of the collecting shell will as a rule lie within the range below, it being understood that the dimensions given below are variable and are only intended as a guide by way of example for the individual configuration and adaptation in a specific application, e.g. to the respective type of horse. For a normal horse ("normal type") the dimensions are as a rule:

a) Dimensions of the urine entry opening (10*c*): longitudinal axis (vertical) about 9 to 13 cm; transverse axis, lower region measured about 2 cm above the lower inner edge about 4 to 7 cm, upper region measured about 2 cm below the upper inner edge about 2 to 4 cm.

b) Crown (10*d*) : longitudinal axis (vertical) about 12 to 18 cm, transverse axis, lower region (measured as for urine collecting opening) about 7 to 12 cm, upper region (measured as for urine collecting opening) about 5 to 9 cm; crown thickness about 1.5 to 2.5 cm.

In the case of cold-blooded animals ("cold-blooded type"), the urine entry opening is regularly larger than what was described previously for the normal type. Thus the dimension of the urine entry opening in the cold-blooded type in the longitudinal axis (vertical) will have dimensions of about 13 to 20 cm, the other measurements corresponding to the measurements given for the normal type under a) and b).

Figure 2:
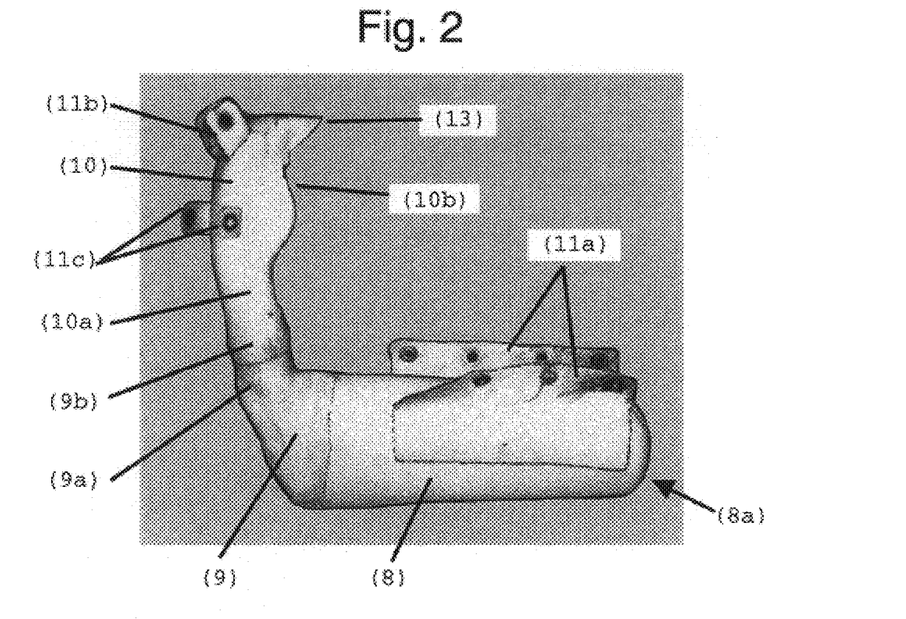
FIG. 2 Side view of the urine collecting device with a lateral view of the head part (10)

When the head part is viewed from the side (see e.g. FIG. 2), the lateral vertical extent of the outer arc of the S-shaped head part at the level of the lower end of the urine collecting shell (10*b*)—i.e. at about the height of the flaps (11*c*) in FIG. 2—is about 10 to 15 cm; the corresponding laterally vertical extent of the overlying inner arc of the S-shaped head part is about 7 to 12 cm.

The urine collecting shell may if desired also have a notch (perineal notch) in the upper crown region, which lies between the vulva and anus virtually as a tab over the perineum and advantageously supports the orientation and average fixing in position of the urine collecting shell over the vulva. If, therefore, the urine collecting shell has possibly been displaced from its original position due to the mare occasionally lying down, it will readily move back into the correct position upon standing up due to the movement of the animal.

Furthermore, in particular with the "normal type" animal, it may prove advantageous to provide a thin, very flexible "canopy" (13), made for example of latex or silicone, on the head part (10) on the horse side above the urine collecting shell as a feces deflector and to deflect any small quantities of liquid flowing out after defecation. The canopy (13) is however purely optional and the function according to the invention of the head part (10) is also already optimally assured in every respect without such a canopy when used. As a rule, the canopy will therefore not be necessary either for the normal type or for the cold-blooded type, and horses of the Haflinger type can regularly manage entirely without a canopy. However, a canopy may prove advantageous for certain breeds of horse, types or in particular mares which have already foaled fairly frequently. If the head part if desired is provided with a canopy (13), even small dimensions are enough, which for adaptation to the animal lie in about the range of 4×4 to 6×6 cm; in this case, about 2 to 3 cm lie glued or welded against the head part and the remaining maximum of 2 to 3 cm (or after adaptation shortened even further to 1 to 2 cm) project to the side of the urine collecting shell as the actual canopy. Maximum dimensions of this canopy, for adaptation to the animal, lie in about the range of at most 8×8 to 10×10 cm, with about 4 to 5 cm then lying glued or welded to the head part and the remaining 4 to 5 cm projecting to the side of the urine collecting shell as the actual canopy. In the case of production of a head part with canopy, advantageously care should be taken that the canopy should initially have an excess length of a few centimeters (for example about 2 to 5 cm) , in order to permit comfortable individual adaptation of the canopy length to the respective animal simply by cutting to size and optionally by rounding off corners. This canopy which serves as a feces deflector effectively prevents undesirable contamination of the urine by feces also in the aforementioned cases for optional use of this canopy and assures a good quality and purity of the collected urine.

In addition to the advantages already described above in conjunction with the explanation of the holding harness with urine collecting device according to the invention, the invention furthermore offers additional advantages.

The holding harness with net (7) according to the invention can be used universally, and as a result of its design can be handled easily. Urine collecting devices can be suspended therefrom flexibly and with good fixing in position. The attachment or removal of the harness can be carried out rapidly with fluent movements once basic adjustment has been performed, so that there is scarcely any fear of unsettling the horse by undesirable hectic handling and the resulting dangers. The attachment or removal of the holding harness can therefore be effected in 2 to 3 minutes, and as a rule merely the belly buckles of the girth and lower breast strap located between the front legs need to be opened. The holding harness can be worn long-term both with and without a urine collecting device. Thus, for example, 24-hour urine collection is possible, provided that the urine collecting device is appropriately looked after and kept clean, the urine collecting device being readily removable from the horse or exchangeable for emptying and cleaning, which takes place at least twice a day. Due to the holding harness, the horse can move freely even with the urine collecting device. Because of the high flexibility and freedom of movement for the horse which is assured when using the holding harness according to the invention with or without urine collecting device, it is not necessary to tether the horse in a narrow stall. The horse can therefore graze at any time, even with an attached urine collecting device. Likewise, foals can suckle at any time without problems even on mares with an attached urine collecting device; see e.g. FIG. 6b. The urine collecting device is very robust due to the selected materials and design, and can be used both in hot and in cold zones of the world. The holding harness with urine collecting device according to the invention can therefore be adjusted very flexibly to the local conditions of the horse farm in which urine is to be collected. For example, if necessary the entire holding harness and the urine collecting device can be removed easily and rapidly and then reattached, or the holding harness can be left on the horse long-term and if necessary only the urine collecting device can be removed, e.g. during the day for grazing, if only nocturnal collection of urine is intended; however—given appropriate attention and regular emptying, as already stated above—the entire holding harness with urine collecting device can also remain complete on the horse for a relatively long time, without restricting its freedom of movement and the possibility of grazing or suckling by foals.

The following figures serve to explain the present invention.

Figure 1:
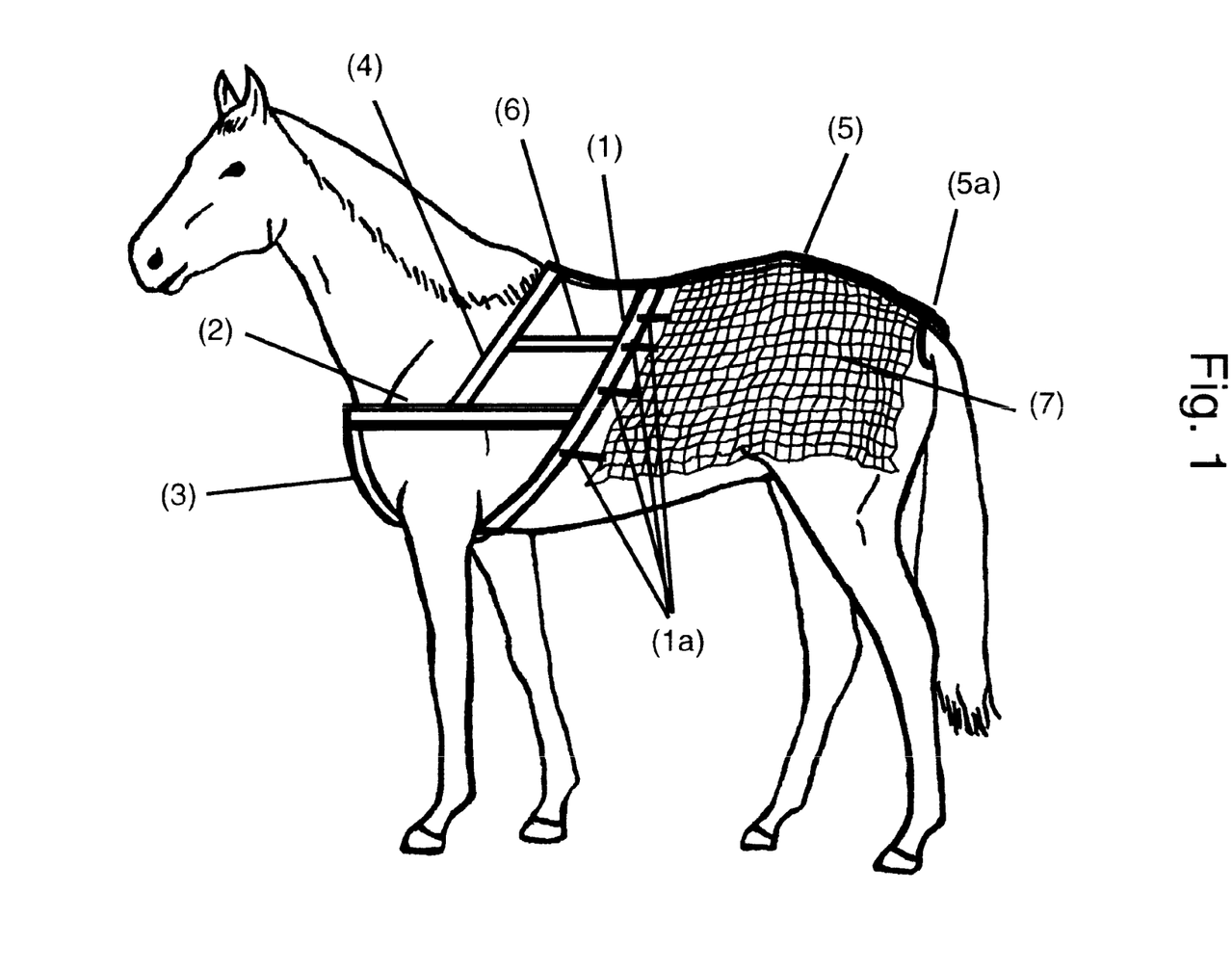
FIG. 1 Diagram of the holding harness for attaching a urine collecting device to the horse.

Girth (1); adjustable length fastening elements (1a); breast strap (2); lower breast strap (3); withers strap (4); crupper (5) with tail loop (5a); side strap (6); net (7).

Urine collecting pouch (8) with possible position of a urine discharge tube (8a); middle section (9) with tubular connecting piece (9a) and reinforcing region (9b); head part (10) with neck (10a), which overlaps the connecting piece (9a) in the reinforcing region (9b); urine collecting shell (10b) ; flaps (11a) in the form of wing flaps each with 4 eyelets (instead of 3 eyelets in the preferred embodiment); individual flaps (11b); optional individual flaps (11c), which may optionally be displaced upwards towards the flaps (11b) and fused therewith to form small wing flaps each with 2 eyelets; canopy (13) as a feces deflector and anal liquid deflector.

Figure 3:
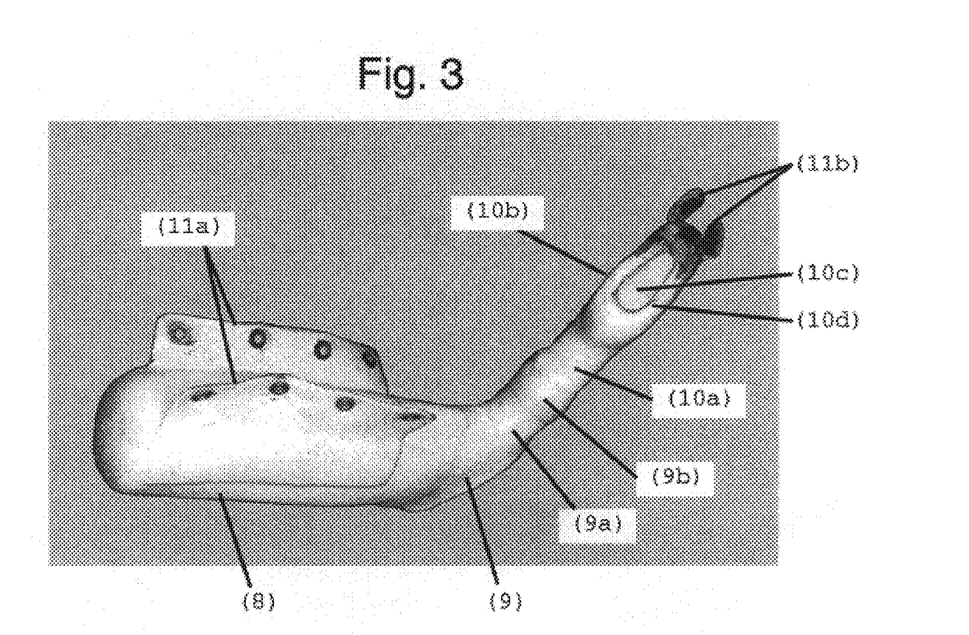
FIG. 3 Side view of the urine collecting device with an inside view of the urine collecting shell (10b)

For (8) to (10a) and (11a) to (11b), see explanations for FIG. 2; urine collecting shell (10b) with urine entry opening (10c); crown (10d) of the urine collecting shell.

Figure 4:
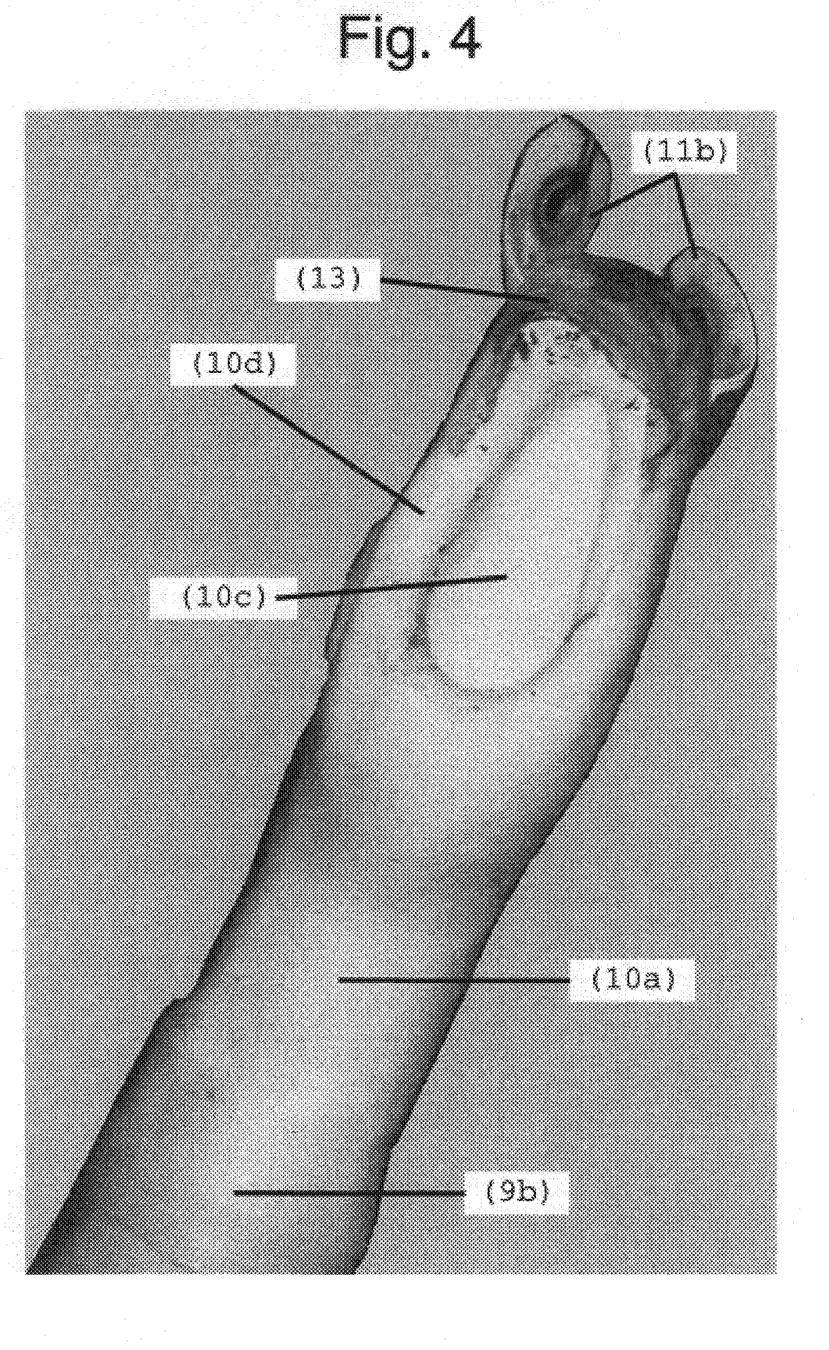
FIG. 4 Enlarged inside view of the urine collecting shell (10b)

For (9b) to (11b), see explanations for FIG. 3; canopy (13) as feces deflector and anal liquid deflector.

Neck (10a) of the head part position of the urine collecting shell (10b); individual flaps (11b) ; optional individual flaps (11c), which may optionally be displaced upwards towards the flaps (11b) and fused therewith to form small wing flaps each with 2 eyelets; stiffening (12) in the head region, optionally fused with the flaps (11b); canopy (13) as feces deflector and anal liquid deflector.

Neck (10a) of the head part; wing flaps (11b), combined with reinforcing (12) in the head region, i.e. optionally fused here with the flaps (11b).

Figure 6A:
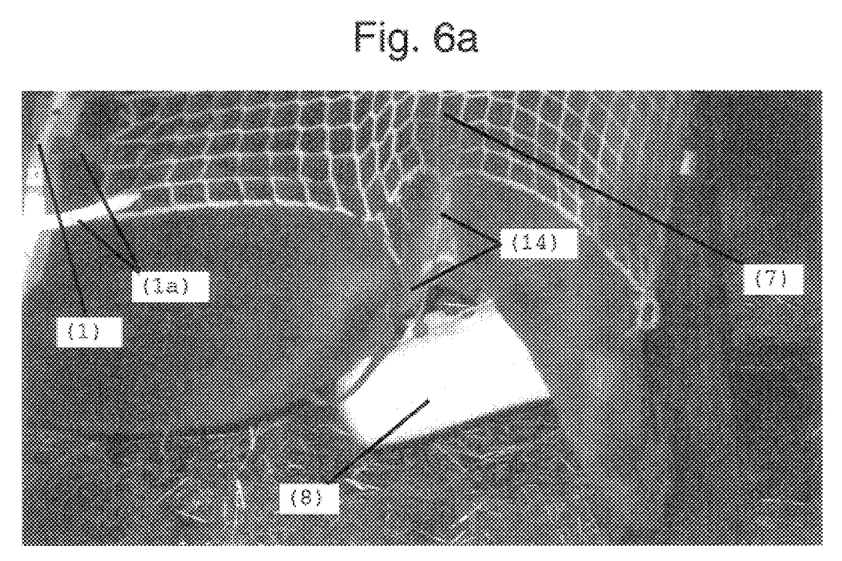
FIG. 6a Side view of a urine collecting device fastened to the horse.
Figure 6B:
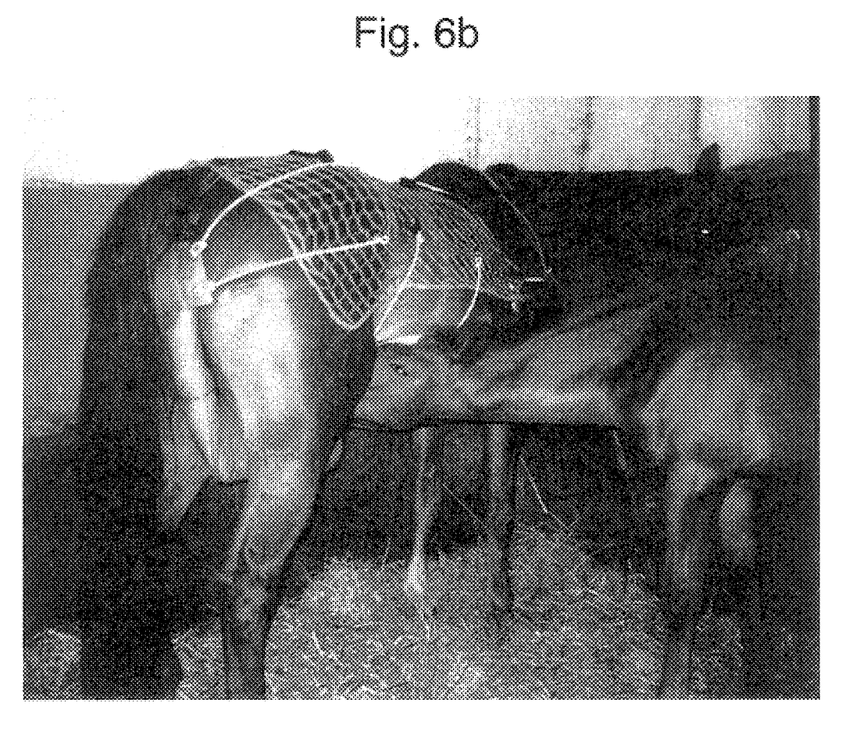
FIG. 6b View of a urine collecting device with head part as in FIG. 5b, which is fastened to the horse and is in use, and suckling foal.

Girth (1) with adjustable length fastening elements (1a) for the net (7); urine collecting device with visible urine collecting pouch (8); expander (14).

Figure 7A:
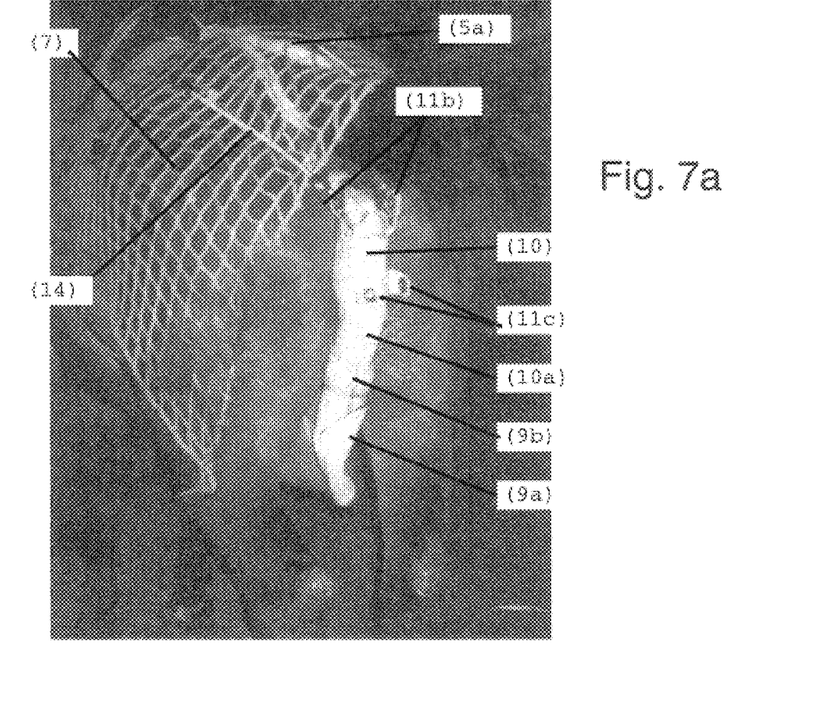
FIG. 7a Rear view of a urine collecting device fastened to the horse.

Tail loop (5a); net (7); discharge connecting piece (9a) with reinforcement region (9b) and overlapping neck (10a) of the head part (10) of the urine collecting device; flaps (11b) and (11c), see FIG. 2 for further explanations; expander (14).

Figure 7B:
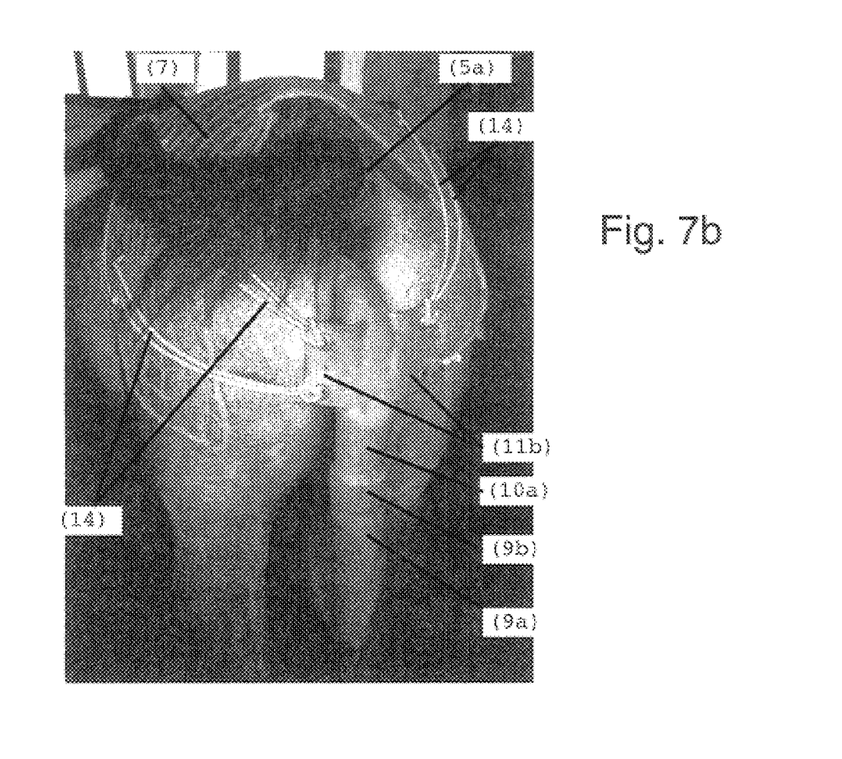
FIG. 7b Rear view of a urine collecting device fastened to the horse.

Tail loop (5a); net (7); discharge connecting piece (9a) with reinforcement region (9b) and overlapping neck (10a) of the head part (10) of the urine collecting device; wing flaps (11b); expander (14).

Figure 8:
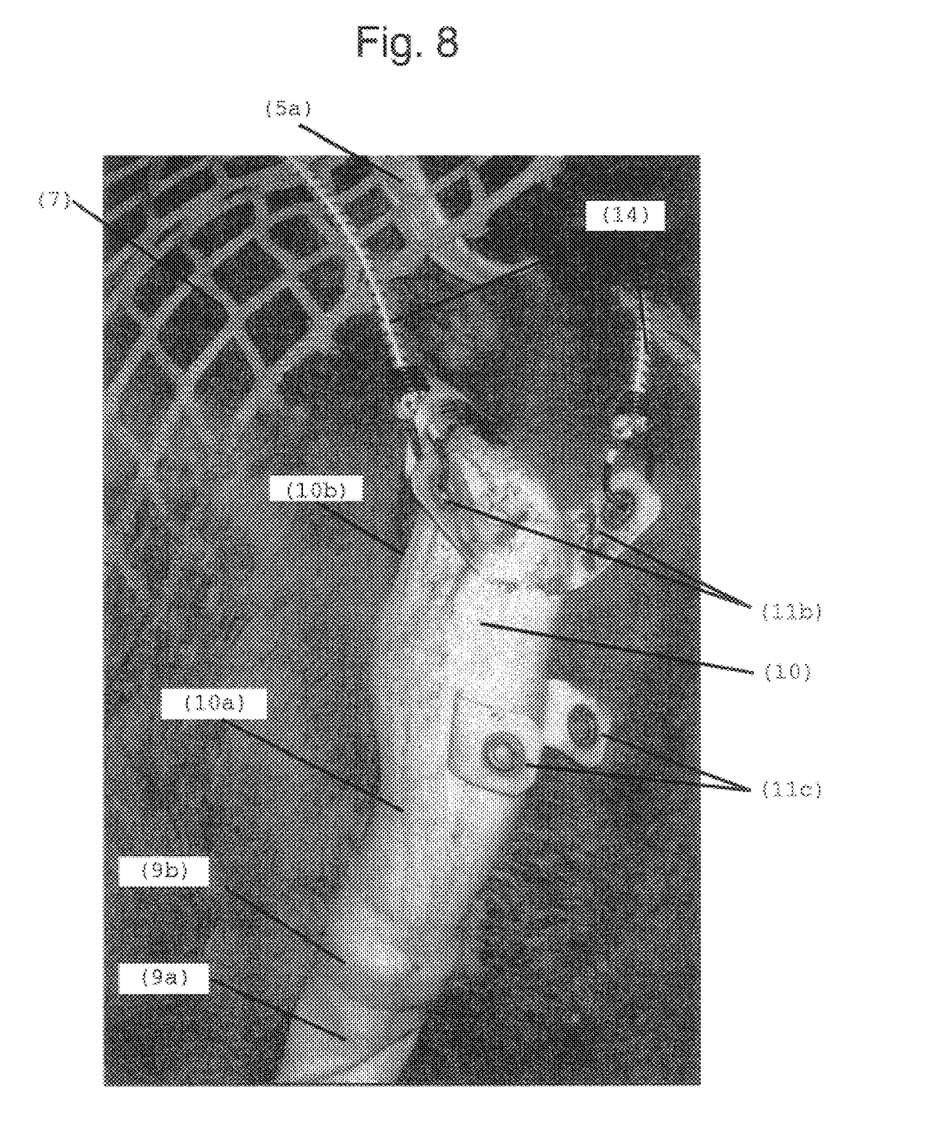
FIG. 8 Rear detailed view of the head part (10) of the urine collecting device which lies against the horse.

For (5a) to (14) see explanations for FIG. 7a.

Figure 9A:
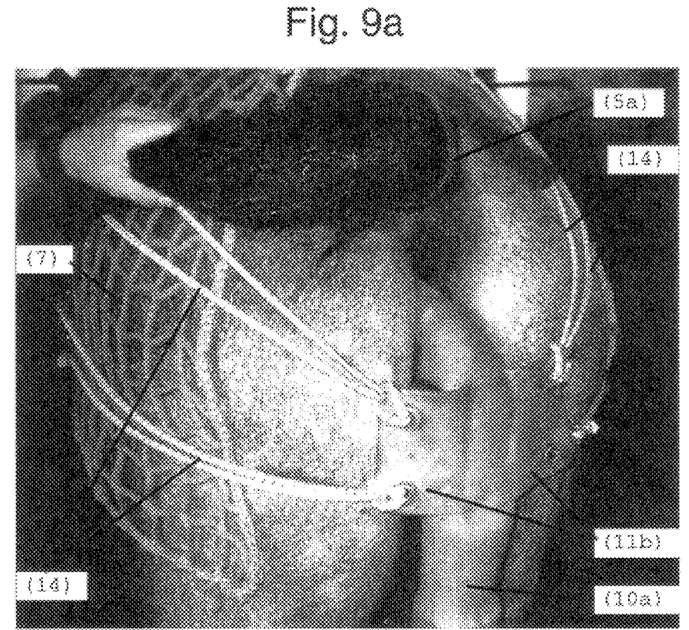
FIG. 9a and- FIG. 9b Rear detailed views of the head part (10) of the urine collecting device which lies against the horse with wing flaps.
Figure 9B:
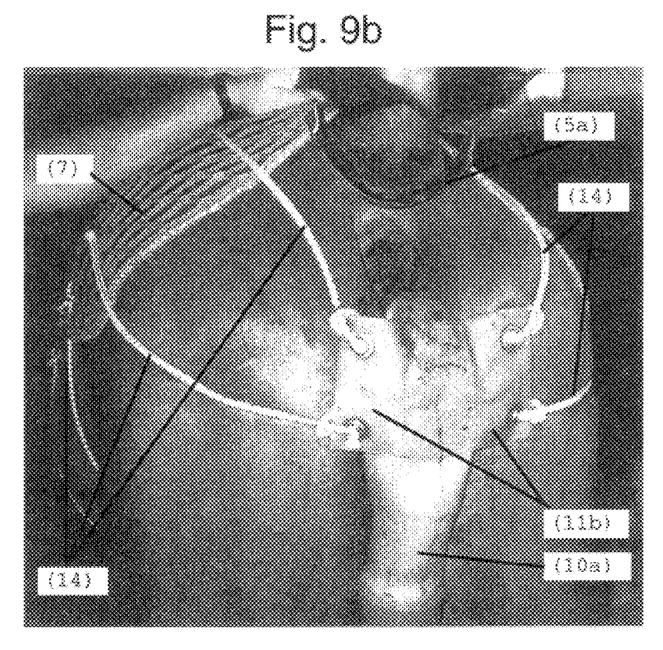

(5a) tail loop; neck (10a) of the head part; wing flaps (11b), on either side two eyelets, combined with stiffening (12) in the head region, i.e. here optionally fused with the wing flaps (11b); expander (14).

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A holding harness with a urine collecting device for female horses, comprising:

A) a basic harness consisting of straps, comprising:
a girth passing around the horse and extending on both sides from the back to the lower breast, wherein in each case at least two conventional fastening elements of adjustable length are attached to the lateral upper part of the girth at some distance from each other;
a breast strap extending around the front breast or shoulder approximately horizontally on both sides of the horse in each case as far as the girth;
a lower breast strap extending from the shoulder, through between the front legs to the girth;

a withers strap extending from the withers on both sides of the horse to the breast strap;

a crupper of adjustable length, extending from the withers strap along the spinal column over the back, loins and croup of the horse to the tail head, with a tail loop surrounding the tail head;

on either side of the horse a side strap extending from the withers strap approximately at the height of the start of the shoulder approximately horizontally to the girth;

the individual straps of the basic harness being equipped with conventional elements for adjusting the strap lengths and being joined together in a manner conventional for horse harnesses, if necessary in completely or partially detachable manner; and B) a large-mesh net covering approximately the loin and croup region and descending laterally to at most approximately the lower rump line, which net is held by the adjustable length fastening elements located on the upper part of the girth, and on which furthermore C) a urine collecting device is suspended detachably but in a position-fixing manner, this urine collecting device in turn comprising:

an elongate collecting pouch which can be suspended in an approximately horizontal position beneath the belly of the horse;

a middle section which tapers in a funnel shape, adjoining the collecting pouch in the region of the rear legs of the horse, which section is passed through between the rear legs and merges into a tubular connecting piece with an approximately vertical arrangement towards the rear part of the horse;

a head part seated on the connecting piece and connected securely thereto via a tubular neck, with a urine collecting shell adapted to the vulva of the horse and lying largely tightly thereagainst; and for fastening the urine collecting device to a holding harness, a plurality of first and second flaps provided with one or more eyelets, with
  a) the first flaps being arranged on both sides in the lateral, upper region of the collecting pouch, and
  b) the second flaps being arranged to the rear side of the urine collecting shell on both sides in the upper region of the head part.

2. A holding harness for fastening a urine collecting device to horses, comprising:

A) a basic harness consisting of straps, comprising:
  a girth passing around the horse and extending on both sides from the back to the lower breast, wherein in each case at least two conventional fastening elements of adjustable length are attached to the lateral upper part of the girth at some distance from each other;
  a breast strap extending around the front breast or shoulder approximately horizontally on both sides of the horse in each case as far as the girth;
  a lower breast strap extending from the shoulder, through between the front legs to the girth;
  a withers strap extending from the withers on both sides of the horse to the breast strap;
  a crupper of adjustable length, extending from the withers strap along the spinal column over the back, loins and croup of the horse to the tail head, with a tail loop surrounding the tail head;
  on either side of the horse a side strap extending from the withers strap approximately at the height of the start of the shoulder approximately horizontally to the girth;
    the individual straps of the basic harness being equipped with conventional elements for adjusting the strap lengths and being joined together in a manner conventional for horse harnesses, if necessary in completely or partially detachable manner; and B) a large-mesh net covering approximately the loin and croup region and descending laterally to at most approximately the lower rump line, which net is held by the adjustable length fastening elements located on the upper part of the girth, and which serves for the position-fixing, but yet detachable suspension of a urine collecting device which can be worn beneath the horse's belly.

3. A urine collecting device for mares comprising:

an elongate collecting pouch which can be suspended in an approximately horizontal position beneath the belly of the horse;

a middle section which tapers in a funnel shape, adjoining the collecting pouch in the region of the rear legs of the horse, which section is passed through between the rear legs and merges into a tubular connecting piece with an approximately vertical arrangement towards the rear part of the horse;

a head part seated on the connecting piece and connected securely thereto by a tubular neck, with a urine collecting shell adapted to the vulva of the horse and lying substantially tightly thereagainst; and for fastening the urine collecting device to a holding harness, a plurality of first and second flaps provided with one or more eyelets, with
  a) the first flaps being arranged on both sides in the lateral, upper region of the collecting pouch, and
  b) the second flaps being arranged to the rear side of the urine collecting shell on both sides in the upper region of the head part.

4. A head part for a urine collecting device for a female horse, the head part comprising:

a urine collecting shell located in an upper region of the head part, wherein the shell extends in an S-shape on the inside toward the vulva of the horse when viewed from the side, which shell is adapted to the vulva of the horse and lies substantially tightly thereagainst, and wherein the urine collecting shell when viewed from the inside is in the form of an oval to egg-shaped ring surrounding a urine inlet opening; and a tubular neck located in a lower region of the head part, which neck serves to connect the head part to an inlet connecting member of a urine collecting pouch.

5. A head part for a urine collecting device according to claim 4, further comprising as a deflector a flexible canopy above the urine collecting shell on the horse side.

6. A head part for a urine collecting device according to claim 4, wherein the S-shaped head part has an inner arc and an outer arc, and the side dimension of the head part at the outer arc is about 10 to 15 cm, and the corresponding side dimension at the inner arc of the S-shaped head part is about 7 to 12 cm.

* * * * *